US012800422B2

(12) United States Patent
Wolff et al.

(10) Patent No.: US 12,800,422 B2
(45) Date of Patent: Nov. 17, 2026

(54) ACTIVE LEAKAGE DETECTION

(71) Applicant: Airbus Operations GmbH, Hamburg (DE)

(72) Inventors: Christian Wolff, Hamburg (DE); Jens-Dietrich Kurre, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 266 days.

(21) Appl. No.: 18/742,167

(22) Filed: Jun. 13, 2024

(65) Prior Publication Data

US 2024/0418594 A1 Dec. 19, 2024

(30) Foreign Application Priority Data

Jun. 15, 2023 (EP) .................................... 23179533

(51) Int. Cl.

| | |
|---|---|
| ***G01M 3/04*** | (2006.01) |
| ***G01M 3/00*** | (2006.01) |
| ***H01M 8/04082*** | (2016.01) |
| ***H01M 8/04664*** | (2016.01) |

(52) U.S. Cl.

CPC ............ *G01M 3/045* (2013.01); *G01M 3/002* (2013.01); *H01M 8/04201* (2013.01); *H01M 8/04671* (2013.01)

(58) Field of Classification Search

CPC .. G01M 3/045; G01M 3/002; H01M 8/04201; H01M 8/04671; G08B 21/16

USPC .............................................................. 73/40

See application file for complete search history.

(56) References Cited

U.S. PATENT DOCUMENTS

| | | | | |
|---|---|---|---|---|
| 3,472,629 | A * | 10/1969 | Dayan | G01N 25/40 422/409 |
| 3,716,337 | A * | 2/1973 | Jones | G01N 25/48 436/147 |
| 10,620,179 | B2 * | 4/2020 | Damazo | G01N 25/52 |
| 2004/0049983 | A1 * | 3/2004 | Abe | A61L 9/03 48/195 |

(Continued)

FOREIGN PATENT DOCUMENTS

| | | |
|---|---|---|
| EP | 4019136 A1 | 6/2022 |
| WO | 2007034872 A1 | 3/2007 |

OTHER PUBLICATIONS

Extended European Search Report for Application No. 23179533.7, dated Nov. 22, 2023, 7 pages.

*Primary Examiner* — Marrit Eyassu

(74) *Attorney, Agent, or Firm* — KDW Firm PLLC

(57) ABSTRACT

A reaction transmitting device includes an emission generating compound provided as an elongate transmitting structure having first and second ends, the emission generating compound reaching from the first to the second end. The emission generating compound can be exposed to local thermal energy release at a trigger location between the first and second end along the elongate structure resulting from leaked substance from an enclosure, the enclosure configured to encapsulate a substance from surroundings. The emission generating compound provides an emission reaction upon being triggered by the local thermal energy release and relays the emission reaction from the trigger location along the elongate transmitting structure to the second end which is configured to be exposed to a sensing unit configured to detect a transmitted emission reaction as a signal indicative of the leaked substance.

20 Claims, 2 Drawing Sheets

(56) References Cited

U.S. PATENT DOCUMENTS

| | | | | |
|---|---|---|---|---|
| 2014/0130729 | A1 | 5/2014 | Rastegar | |
| 2016/0047719 | A1* | 2/2016 | Kwon | G01M 99/002<br>73/865.6 |

* cited by examiner

ACTIVE LEAKAGE DETECTION

TECHNICAL FIELD

The disclosure herein relates to actively detecting a leakage; more specifically, the disclosure herein relates to a reaction transmitting device, to a detection arrangement, to a system responsive to leakage and to a method for leakage communication at an enclosure.

BACKGROUND

Systems that supply, store or process fluids may undergo a leakage incident. The leakage incident of the fluid may result in a situation that may require immediate clearance. Hence, for certain fluids like hydrogen, as an example, a leakage surveillance system may be applied for detecting a leakage phenomenon and to enable subsequent clearing of the leakage incident. However, it has been shown that leakage of some fluids like hydrogen are hard to detect when the leakage is rather small.

SUMMARY

There may thus be a need for improved detection of a leakage of a substance.

The object of the disclosure herein is solved by the subject-matter and embodiments disclosed herein. It should be noted that the following described aspects of the disclosure herein apply also for the reaction transmitting device, for the detection arrangement, for the system responsive to leakage and for the method for leakage communication at an enclosure.

According to the disclosure herein, a reaction transmitting device, comprising an emission generating compound is provided. The emission generating compound is provided as an elongate transmitting structure. The elongate transmitting structure has a first end and a second end and the emission generating compound is arranged reaching from the first end to the second end. The emission generating compound is configured to be exposed to a local thermal energy release at a trigger location between the first end and the second end along the elongate structure resulting from leaked substance from an enclosure, the enclosure being configured to encapsulate a substance from surroundings. The emission generating compound is configured to provide an emission reaction upon being triggered by the local thermal energy release. The emission generating compound is configured to relay the emission reaction from the trigger location along the elongate transmitting structure to the second end. The second end is configured to be exposed to a sensing unit configured to detect a transmitted emission reaction as a signal indicative of the leaked substance.

As an advantage, the detection of a hydrogen flame and optionally a hydrogen leakage is quick, since the ignitable pyrotechnic material—e.g. cellulose nitrate or similar—burns down extremely fast.

As an advantage, the detection is reliable, since physical and/or chemical sensors are only triggered if the ignitable material burns down, and in particular useful to detect minor leakages.

As an advantage, the detection is comprehensive, while the detection covers the whole system area and even hydrogen micro flames can be detected at any location which is covered by the ignitable pyrotechnic material.

As a further advantage, local hot spots are detected easily.

As an advantage, all areas of potential flames are so-to-speak optically covered.

As an advantage, the detection is deflagration resistant and safe, since the ignitable material burns down rapidly and completely, without any solid residuals and without the risk to ignite surrounding materials which in any case need to be fire retardant.

As an advantage, leakage sites invisible to conventional detector technology are disclosed.

According to an example, the reaction transmitting device comprises an elongate conduit structure. The elongate conduit structure has a first conduit end and a second conduit end and provides an inner volume between the first conduit end and the second conduit end. The emission generating compound is arranged within the inner volume reaching from the first conduit end to the second conduit end. The first conduit end is configured to be exposed to the local thermal energy release at the trigger location between the first conduit end and the second conduit end along the elongate conduit structure resulting from the leaked substance from the enclosure. The conduit structure is configured to provide for the emission reaction of the emission generating compound. The conduit structure is configured to provide for the emission reaction upon being triggered by the local thermal energy release. The conduit structure is configured to relay the emission reaction from the trigger location along the elongate transmitting structure to the second conduit end. The second conduit end is configured to be exposed to the sensing unit configured to detect the transmitted emission reaction as the signal indicative of the leaked substance.

According to an example, the local thermal energy release results from burning leaked hydrogen.

According to the disclosure herein, a detection arrangement is provided. The detection arrangement comprises at least one sensing unit and at least one reaction transmitting device according to one of the previous examples. The at least one sensing unit is arranged at the second end of the at least one reaction transmitting device. The at least one sensing unit is configured to generate a detection signal upon receiving an emission of the emission reaction from the at least one reaction transmitting device.

According to the disclosure herein, also a supply system responsive to leakage is provided. The supply system comprises at least one detection arrangement according to the previous examples and an enclosure for storing a substance. The at least one detection arrangement is provided with the first end of the reaction transmitting device close to an area at the enclosure to-be-monitored for leakage.

According to an example, the system further comprises at least one supply line with a shutoff valve and a processor. The at least one supply line is connected to the enclosure and configured to supply the enclosure with hydrogen when the shutoff valve is open. The shutoff valve is configured to stop hydrogen supply to the enclosure when the shutoff valve is closed. The processor is connected to the at least one sensing unit and to the shutoff valve. The at least one detection arrangement is configured to monitor the enclosure and to generate a detection signal. Upon receiving a detection signal from the at least one sensing unit, the processor is configured to close the shutoff valve in order to stop supply of hydrogen by the supply lines to and/or from the enclosure.

According to the disclosure herein, also a method for leakage communication at an enclosure is provided. The method comprises:

Providing an elongate transmitting structure,

Arranging a first end of the elongate transmitting structure at the enclosure,

Arranging a second end of the elongate transmitting structure at a sensing unit, when the first end, or a location somewhere in between, is being exposed to a local thermal energy release resulting from leaked substance from the enclosure, the emission generating compound is providing an emission reaction upon being triggered by the local thermal energy release. The emission generating compound is relaying the emission reaction from the first end to the second end. The sensing unit is detecting the transmitted emission reaction as a signal indicative of the leaked substance; and Generating, by the at least one sensing unit, a detection signal from the emission reaction that is indicative for leakage at the enclosure.

According to an aspect, a substance to perform a fast chemical reaction when triggered by a leakage is provided as an intermediate component between an enclosure, where leakage might occur, and a detector. The intermediate component transmits a "signal" in form of the fast chemical reaction along the longitudinal component. The intermediate component allows to arrange a detector or sensor distanced from the enclosure. The intermediate component acts like a fuse or detonating cord, but with the goal to transmit the igniting occurrence as fast as possible.

According to an aspect, a quick and reliable detection of a leakage phenomenon, e.g., hydrogen flame, is enabled. The detection is based on the following principle. A hydrogen flame occurs, e.g., due to a failure case in a fuel cell system, i.e. the enclosure. The hydrogen flame immediately ignites an easily ignitable pyrotechnic material that surrounds the fuel cell system. Importantly the pyrotechnic material includes the combustible material and the required oxygen so external air/oxygen is not required for the material to burn down. The ignited pyrotechnic material burns down quickly on a dedicated path towards a "sensing unit". The sensing unit is equipped with minimum one physical sensor, e.g., a light/photo sensor and/or temperature sensor and/or pressure sensor and/or acoustic sensor and/or a chemical sensor for combustion products and/or measuring a change of air/gas composition to detect the burning/burnt pyrotechnic material, e.g., photons/light, increased temperature and/or pressure, combustion products, changed air/gas composition. The signal from the sensor unit can be used to trigger the shutdown of the hydrogen supply in a fuel cell system to finally stop the hydrogen flame.

These and other aspects of the disclosure herein will become apparent from and be elucidated with reference to the embodiments described hereinafter.

BRIEF DESCRIPTION OF THE DRAWINGS

Example embodiments of the disclosure herein will be described in the following with reference to the following drawings.

DETAILED DESCRIPTION

Figure 1:
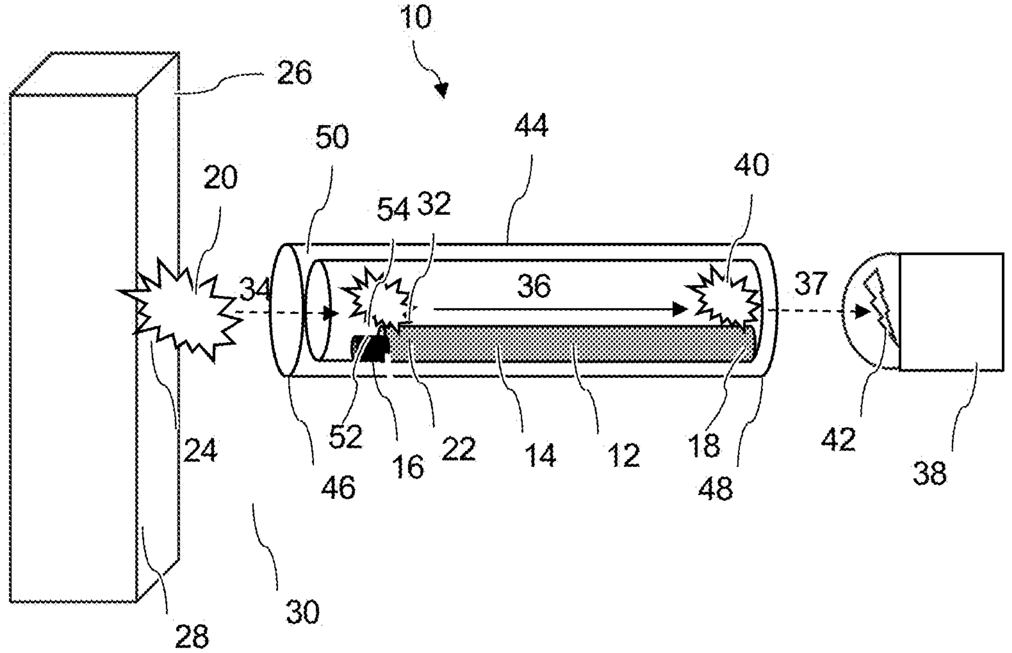
FIG. 1 schematically shows an example of a reaction transmitting device and its application.

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the example embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

FIG. 1 schematically shows an example of a reaction transmitting device 10 and its application. The reaction transmitting device 10 comprises an emission generating compound 12. The emission generating compound 12 is provided as an elongate transmitting structure 14. The elongate transmitting structure 14 has a first end 16 and a second end 18 and the emission generating compound 12 is arranged reaching from the first end 16 to the second end 18. The emission generating compound 12 is configured to be exposed to a local thermal energy release 20 at a trigger location 22 between the first end 16 and the second end 18 along the elongate structure resulting from leaked substance 24 from an enclosure 26, the enclosure 26 being configured to encapsulate a substance 28 from surroundings 30. The emission generating compound 12 is configured to provide an emission reaction 32 upon being triggered, shown by arrow 34 in FIG. 1, by the local thermal energy release 20. The emission generating compound 12 is configured to relay, shown by arrow 36 in FIG. 1, the emission reaction 32 from the trigger location 22 along the elongate transmitting structure 14 to the second end 18. The second end 18 is configured to be exposed to a sensing unit 38 configured to detect a transmitted emission reaction 40 as a signal 42 indicative of the leaked substance 24.

The term "reaction transmitting device" can also be understood as a transmitter, transporter, conveyer, courier, transmitter, delivery of the location of a chemical reaction in spatial means.

In an example, the reaction transmitting device 10 is formed like a fuse but accelerates the function of a fuse, such that it does not delay its reaction from burning from one end to the other end. The fuse the reaction transmitting device 10 provides, accelerates its burning from one end—or somewhere in-between—to the other end.

In an example, the fuse is triggered to burn at any location between its first end and the second end, the first and the second end included. The burning spreads from the first to the second end, but also from the second end to the first end or from any location between its first end and the second end to the first and/or the second end. This means the trigger point can be at any point on the reaction transmitting device 10 and spread the emission reaction to any point on the reaction transmitting device.

In an example, the reaction transmitting device 10 is configured such that the reaction spreads from a trigger point between its first end and second end to the first and the second end. This opens two parallel communication channels at the first end and the second end.

The term "elongate transmitting structure" can be understood as an emission generating compound 12 in the form of a coil, strand, wire, thread, line, but more like a tubing or pipeline. Elongate means that the emission generating compound 12 is having a stretched form over a distance and follows a path along, for example, a conduit channel for infrastructure of a machining room, not shown in FIG. 1.

In an example, emission generating compound 12 comprises an incombustible, temperature stable and gas tight support material that keeps the elongate transmitting structure 14 in shape and flexible.

The terms "first end" and "second end" refers to the ending pieces of the elongate transmitting structure 14 in FIG. 1 that can comprise multiple shapes and forms.

In an example, the location between the first end 16 and the second end 18 also comprises the first end 16 or the second end 18 as the trigger location 22.

The term "emission generating compound" can be understood as a substance that actively expels, emits or transmits a part of itself into its environment. The emission generating compound 12 can also be referred to as emitter, transmitter, pulse transmitter, pulse emitter, radiator, transducer, projector, sender, or source.

The emission does not necessarily comprise the material itself, it predominantly comprises a chemically and physically transformed part of the material.

The compound can also be referred to as substance, agent or material.

The term "arranged" refers to the manner in how the emission generating compound 12 is distributed in the inner volume or volume of the conduit structure of FIG. 1.

In an example, the emission generating compound 12 covers the inner wall of the inner volume.

In another example, the emission generating compound 12 fills out the inner volume.

In another example, the portions of the emission generating compound 12 are distributed in the inner volume in a distance to each other.

In an example, the emission generating compound 12 reaches from the first end 16 to at least near the second end 18.

The term "local thermal energy release" refers to an event involving a heat evolution at a certain site of the enclosure 26 in FIG. 1.

In an example, the local thermal energy release 20 or the release of thermal energy takes place at the substance 28 burning in a combustion reaction. The thermal energy is released via a flame of the burning substance 28 in the form of radiation or convection, not shown in FIG. 1.

In an example, flames of a burning substance 28 transmit their thermal energy predominantly via convection. This makes the flames difficult to detect via their emitted radiation. The emission generating compound 12 is activated by the heat convection of the flame, leading to an emission reaction 32, respectively a chemical reaction and a second flame with a higher radiation inside the inner volume of the conduit structure, which is easier to detect.

In an example, the flames stem from burning fuel as leaking fluid.

In an example, the flames stem from burning hydrogen as leaking fluid.

In another example, the hydrogen burns to yield hydrogen micro flames outside at the surface of the enclosure 26.

The term "leaked substance" can also be referred to as leaking substance. It refers to the process of a fluid permeating, diffusing or creeping through channels and holes of the enclosure 26 from the inner volume of the enclosure 26 to the outside of the enclosure 26 in FIG. 1.

The term "enclosure" refers to an entity that separates two spaces, i.e. an enclosed space from a surrounding or environment. One space is the environment and the other space is an inner volume inside the enclosure 26. The inner volume and the environment are not in direct contact or communication with each other. The enclosure 26 encloses the inner volume. The inner volume can be referred to as inside.

The enclosure 26 can also be referred to as a tank, a vessel, a container, a cistern or a basin. In an example, the storing unit can also be a tube or a pipe or a piping system, not shown in FIG. 1.

The term "encapsulating" refers to the function of the enclosure 26 in separating the inner volume from the environment such that they do not contact each other.

The term "substance" refers to matter and can be in a gaseous or liquid state being a fluid.

In an example, the substance 28 is a material that carries a chemical energy.

In an example, the substance 28 is a fuel.

In an example, the substance 28 comprises hydrogen.

In another example, the substance 28 is cryogenic or liquid hydrogen.

In another example, the substance 28 is pressurized hydrogen.

In an example, the enclosure 26 is leak-tight under normal conditions with respect to hydrogen.

The term "triggered" can be understood as heat transfer between the local thermal energy release 20 in FIG. 1 and the emission generating compound 12 that supplies an activation energy to the emission generating compound 12. The term "activation energy" can be understood as an energetic barrier that needs to be overcome such that the emission generating compound 12 changes its state or condition by itself. The change of state is irreversible and is induced by applying a certain amount of energy to the emission generating compound 12. The certain amount or quantum of energy can be applied in the form of electromagnetic, thermal or mechanical energy.

The term "relay" refers to the way in how the reaction is propagated, delivered, transferred, conducted, led, transmitted or transported from the first end 16 of the conduit structure to the second end 18 as indicated by arrow 36 in FIG. 1.

In an example, the conduit structure comprises glass fibers, or small diameter steel tubes, the glass fibers or small diameter steel tubes are configured to transmit emission of the emission reaction 32, fully separated from the outer environment. In this case application of the emission generating compound 12 at the first end 16 is required only and not along the path from the first end 16 to the second end 18, as shown for example in FIG. 1.

In an example, the conduit structure comprises glass fiber from the first to the second end, the emission generating compound is located between the first and the second end of the glass fiber. The emission generating compound is configured to transmit its emission reaction via the glass fiber to the first and/or the second end.

In an example, the glass fibers are at least partly filled with the emission generating compound.

In an example, the glass fibers are covered at least partly with the emission generating compound.

In an example, the glass fibers comprise at least partly the emission generating compound.

The term "signal" refers to a reaction that is caused by the emission reaction 32 in the sensing unit 38 or in the reaction transmitting device 10 itself. The signal 42 can be perceived as an optical, acoustic, electric or mechanical signal, or their combinations.

The term "surroundings" can be understood as a structure the enclosure 26 is connected to or embedded in. The surroundings 30 are at the environment. Outside of the surroundings 30 is the external environment. In an example, the surroundings 30 are a storage space of a vehicle.

In another example, the surroundings 30 are the interior of an aircraft.

The emission reaction 32 can also be referred to as chemical reaction. It refers to the rearrangement and transfer of electrons between the atoms within the matter of the emission generating compound 12. The rearrangement within the atomic structure of the emission generating compound 12 causes an emission of matter and energy.

The term "exposed" means that the sensing unit 38 is arranged in a distance to the reaction transmitting device 10 such that the sensing unit 38 is in contact, as shown by the arrow 37 in FIG. 1, with the products of the emission reaction 40.

The term "sensing unit" refers to an entity that is able to generate a signal 42 upon contact with the emission.

In an example, the sensing unit 38 is configured as part of a detector.

In an example, the sensing unit 38 is responsive to electromagnetic waves, to matter waves, such as vibration or certain particles in the matter wave. The electromagnetic waves comprise UV, VIS, IR, at 180 to 800 nm wavelength or microwave radiation. The matter waves might further comprise atoms, ions, molecules or electrons, protons or neutrons.

In an example, the reaction transmitting device 10 can also be regarded as part of a detector.

In FIG. 1, the elongate transmitting structure 14 resides in an elongate conduit structure 44 as an option. It is noted that the elongate conduit structure 44 can also be omitted, while the emission generating compound 12 is combined with the support material, as described above, e.g., applied as a coating on a wire to provide the reaction transmitting device 10.

In an example, the emission generating compound 12 comprises a fibrous compound like cellulose nitrate, that provides the elongate reaction transmitting device from the fibers itself.

In an example, the emission generating compound 12 comprises a binder and is pressed or extruded in an elongate transmitting structure 14.

In an option of FIG. 1, the reaction transmitting device 10 comprises an elongate conduit structure 44. The elongate conduit structure 44 has a first conduit end 46 and a second conduit end 48 and provides an inner volume 50 between the first conduit end 46 and the second conduit end 48. The emission generating compound 12 is arranged within the inner volume 50 reaching from the first conduit end 46 to the second conduit end 48. The first conduit end 46 is configured to be exposed to the local thermal energy release 20 at the trigger location 22 between the first conduit end 46 and the second conduit end 48 along the elongate conduit structure 44 resulting from the leaked substance 24 from the enclosure 26. The conduit structure is configured to provide for the emission reaction 32 of the emission generating compound 12 upon being triggered by the local thermal energy release 20. The conduit structure is configured to relay the emission reaction 32 from the trigger location 22 along the elongate transmitting structure 14 to the second conduit end 48. The second conduit end 48 is configured to be exposed to the sensing unit 38 configured to detect the transmitted emission reaction 40 as the signal 42 indicative of the leaked substance 24.

The term "elongate conduit structure" can be understood as a coil, strand, wire, thread, line, but more like a tubing or pipeline. Elongate means that the tube or pipe is stretched over a distance and follows a path along, for example, a conduit channel for guiding the signal from a hardly accessible leakage location to a signal evaluation unit.

In an example, the conduit structure is made from a flexible material.

In an example, the conduit structure is made from a thermal insulating material.

The terms "first conduit end" and "second conduit end" refer to the ending pieces, or ending ports of the conduit structure, or the pipe or the tube.

In an example, these conduit ending pieces are sealed by the material of the walls of the elongate conduit structure 44, not shown in FIG. 1.

In another example, the conduit endings are sealed by a membrane that is permeable for certain matter or energy, not shown in FIG. 1.

In another example, the conduit endings expose the emission generating compound 12 to the surroundings 30, not shown in FIG. 1.

The term "inner volume" refers to the volume enclosed by the elongate conduit structure. This volume takes up the emission generating compound 12.

In an example of FIG. 1, the conduit structure is configured to sealingly insulate the emission reaction 32 from the surroundings 30.

The term "sealingly insulate" means that a change of conditions in an object is not transferred to the environment defining the object.

In an example, the conduit structure is configured to insulate the emission reaction 32 from the surroundings 30 to not pose an ignition source to its surroundings 30.

As an advantage, a fast and safe way of communicating a leakage is provided.

In an example of FIG. 1, the local thermal energy release 20 results from burning leaked hydrogen.

In an example, the leaking hydrogen at the enclosure 26 burns and the thermal energy initiates the emission reaction 32 of the emission source, in FIG. 1.

In an example, hydrogen flames are difficult to detect due to their way of transmitting thermal energy.

In an example of FIG. 1, an ignition substance 52 is provided at least at the first end 16. The ignition substance, upon in contact with leaked hydrogen, provides the local thermal energy release 20.

In an example, the local thermal energy release 20 does not only relate to the hydrogen supplying heat by burning but also to the hydrogen supplying energy by its chemical bonds.

In an example, the conduit structure provides a self-boosting effect of the local thermal energy release 20 through the emission reaction 32. The self-boosting effect, not depicted in FIG. 1, leads to propagation of the emission reaction 32 from the first end 16 to the second end 18 of the conduit structure.

The term "self-boosting effect" means that the local thermal energy, e.g., the hydrogen micro flame is enhanced by the chemical reaction of the emission reaction 32 of the emission generating compound 12. The activation energy leads to a chain reaction in the emission generating compound 12. The hydrogen micro flame, not shown in FIG. 1, is a first smaller flame and the chemical reaction of the emission generating compound 12, respectively the emission provides a second larger flame. The second larger flame is easier to detect with the detector. The same refers to the other detectable emissions like mechanical energy or heat energy. The emission generating compound 12 so to say, enhances the event of the leaking substance 24 to make it detectable in a safe manner.

In an example of FIG. 1, the emission generating compound 12 further comprises a reaction starter 54. The reaction starter 54 generates the local thermal energy release 20 upon contact of the emission generating compound 12 with hydrogen and oxygen and/or hydrogen.

In an option, the local thermal energy release 20 is initially generated in the emission generating compound 12. The emission generating compound 12 comprises a reaction initiator or reaction starter 54 that produces activation energy upon contact with the leaking substance 24 from the enclosure 26. Here the activation energy can also be regarded as the energy of the chemical bonds of the leaking substance 24.

In an example, the reaction initiator produces heat as activation energy in contact with hydrogen or hydrogen and oxygen, not shown in FIG. 1.

In an example, the reaction initiator comprises an organometallic compound.

In an example, the reaction initiator comprises Pd, or Pt.

In an example, the emission generating compound 12 might also comprise other substances that:

- retard the chemical reaction rate to slow down the reaction;
- amplify the reaction products; or
- confine its emission reaction.

In an example, the easily ignitable material, i.e., the emission generating compound 12 can be surrounded by, and/or combined with, a catalytic material which heats up through the catalytic oxidation of hydrogen when air, oxygen, is present. There may also be materials which generate an exothermic reaction with hydrogen even without oxygen being present. By this combination a hydrogen gas leakage can also be detected because the generated heat ignites the combustible material.

In an example not shown in FIG. 1, the elongate conduit structure 44 is further configured to accelerate and/or focus the propagation of the emission reaction 32 from the first end 16 to the second end 18.

In an example, the inner walls of the conduit structure or the conduit structure are configured to enhance photon transmission.

In an example, the conduit structure is configured as branched conduit structure comprising conduit branches which is not shown in FIG. 1. The conduit branches form multiple first ends and/or second ends. Intersections of the branched conduit structure between the multiple first ends and the multiple second ends are configured to be exposed to the local thermal energy resulting from leaked substance 24. The conduit branches and the emission generating compound 12 are configured to transport the emission reaction 32 from the first end 16 or the multiple first ends and/or the intersections to the second end 18 or the multiple second ends.

In an example, the emission reaction 32 inside the inner volume 50 produces an emission flash. The emission flash is further configured by the inner volume 50 to spread faster than the local thermal energy release 20 and the leaked substance 24 in the surroundings 30 of the enclosure 26.

In an example the emission generating compound 12 is configured to indicate, by its emission flash, a location of the leaked substance 24 at the enclosure 26.

In an example, different emission generating compounds are distributed at different individual regions of an enclosure providing a unique and single chemical identity of the individual regions, like a pattern of a fingerprint. Depending on the outcome of the measurement of the emission reaction of the different emission generating compounds, respectively the composition of the emission reaction by chemical and physical means, or in other words by assessing its emission pattern, the individual region having leaked substance 24 can be detected more accurately and in shorter time.

In an example, the emission generating compound 12 consumes itself during the exothermic oxidation reaction without leaving residuals that occlude the inner volume 50 of the conduit structure in FIG. 1.

In an example, the emission generating compound 12 reacts with itself and transforms itself completely to a gaseous product, i.e., a fluid that is conducted through the conduit structure.

As an effect, the emission generating compound 12 does not leave fire sources or sparks of solid residuals behind after chemical reaction.

As an effect, occlusion of the tube is prevented.

As an advantage, reliability of the reaction transmitting device 10 is ensured.

As an advantage, a safe emission generating compound 12 is provided.

In an example, the substance 28 is hydrogen and the chemical reaction of the emission generating compound 12 is initiated by a thermal energy release from burning hydrogen at the enclosure 26, not shown in FIG. 1.

In an example, the leaking hydrogen at the enclosure 26 burns and the thermal energy initiates the chemical reaction of the emission source.

In an example, not shown in FIG. 1, the emission generating compound 12 is a pyrotechnic material. The pyrotechnic material is chemically reactive under oxygen-poor atmosphere.

The term “exothermic oxidation reaction” describes an electron transfer reaction within the emission generating compound 12 between an oxidizing agent and a reducing agent, which emits thermal, and/or optical energy and the reaction products.

In an example, the emission generating compound 12 comprises an oxidizing agent and a reducing agent, not shown in FIG. 1.

In an example, the oxidizing agent comprises an oxygen source and the reducing agent comprises a metal and/or a non-metal, not shown in FIG. 1.

In an example, the non-metal comprises at least one of the group of: carbon, sulphur or nitrogen or combinations thereof.

In an example, the emission generating compound 12 is a pyrotechnical material, not shown in FIG. 1.

In an example, the emission generating compound 12 is cellulose nitrate, not shown in FIG. 1.

In an example, the cellulose nitrate comprises different degrees of nitration yielding different functionalities.

In an example, the conduit structure is made from a pyrotechnic material.

As an effect, the chemical reaction of the emission generating compound 12 proceeds under oxygen-poor conditions.

As an advantage, the emission generating compound 12 can be deployed in oxygen-poor environments.

Figure 2:
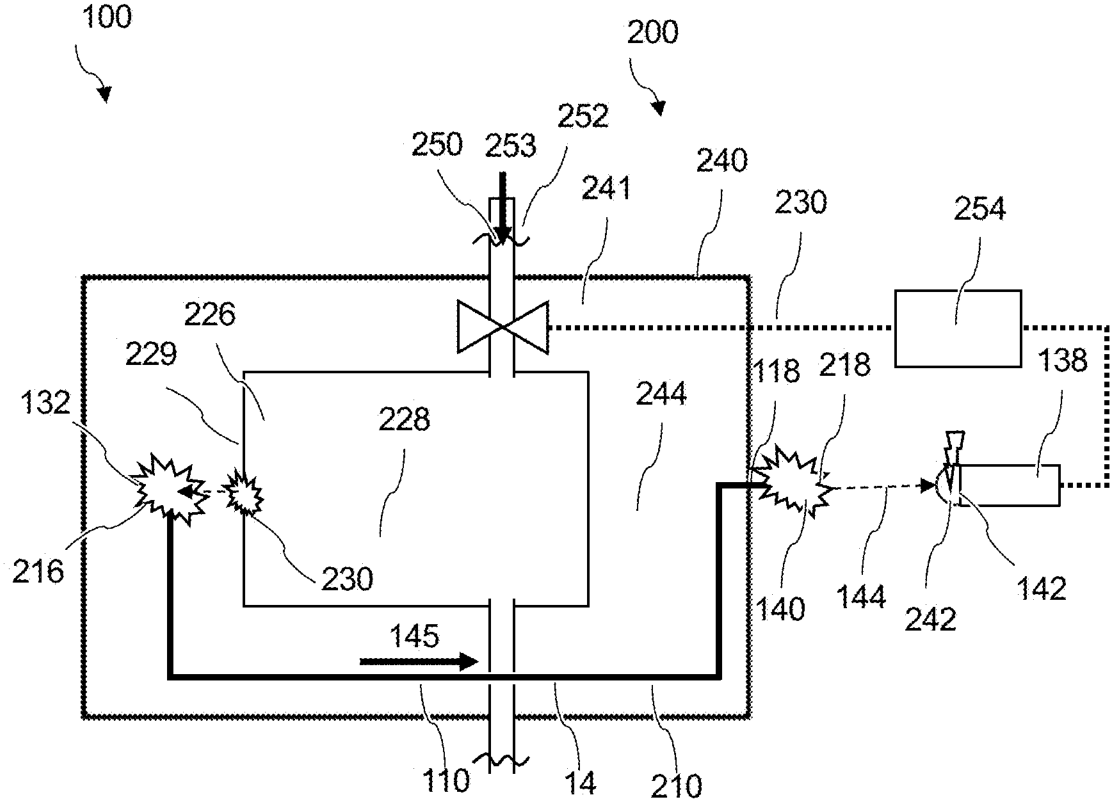
FIG. 2 shows an example of a detection arrangement and a supply system responsive to leakage.

FIG. 2 shows an example of a detection arrangement. The detection arrangement 100 comprises at least one sensing unit 138 and at least one reaction transmitting device 110 according to one of the previous examples. The at least one sensing unit 138 is arranged at the second end 118 of the at least one reaction transmitting device 110. The at least one sensing unit 138 is configured to generate a detection signal 142 upon receiving an emission 144 of the emission reaction 140 from the at least one reaction transmitting device 110. The emission reaction is transmitted in direction of arrow 145 from the reaction transmitting device 110 to the second end 118.

In an example, the sensing unit 138 in FIG. 2 responds to the fume molecules and/or energy of the emission 144 of the emission generating compound 12. In this case the sensing unit 138 samples the emission 144 with IR or UV/VIS radiation in order to gain a light absorbance or emission signal 142. The sensing unit 138 might also comprise a mass spectrometer or a gas chromatograph. The sensing unit 138 can be an NMR spectrometer.

In an example, the sensing unit 138 is a carbon monoxide detector.

In an example, the emission 144 is configured such that it overcomes obstacles in the detection distance to the detector, not shown in FIG. 2.

In an example, more than one sensing unit 138 is provided, for example two, three, five or an array of detectors and different kinds of sensing units are combined.

In an example, the sensing unit 138 is provided with a photo multiplier.

In an example, the reaction transmitting device 110 comprises optical guides, or fiber optics to guide the photons towards the sensing unit 138.

In an example, the reaction transmitting device 110 provides a concentrator, not shown in FIG. 2, in front of the sensing unit 138 in order to accumulate emission 144.

In an example, several reaction transmitting devices are provided, like two, three or five that extend with their second end 118 from one sensing unit 138.

In an example, more than one sensing unit 138 is provided. The plurality of the sensing units is provided at the reaction transmitting device 138. An emission reaction is caused by a leakage of substance at an arbitrary point of the reaction transmitting device. Depending on the spread of the emission reaction and depending on which one of the plurality of the sensing units reacts first, the location of leakage can be determined.

In an example, the plurality of sensing units is provided at a plurality of reaction transmitting devices and the reaction times of the plurality of sensing units are used to locate the leakage of the substance.

In an example, not shown in FIG. 2, the emission 144 of the emission reaction 140 of the at least one reaction transmitting device 110 stems from an exothermic oxidation reaction. The emission 144 comprises at least one of the group of matter and energy.

In an example, the matter comprises atoms, ions, molecules or electrons, protons or neutrons.

In an example, the energy comprises UV, VIS, IR or microwave photons and/or mechanical energy.

In an example, the emission 144 can be perceived as optical, acoustic, electric or mechanical signal, or their combinations.

In another example, the matter is smoke or combustion or fume molecules like CO, CO2, NOx, SO2.

FIG. 2 also shows an example of a supply system 200 responsive to leakage. The supply system 200 comprises at least one detection arrangement 100 according to one of the previous examples and an enclosure 226 for storing a substance 228. The at least one detection arrangement 100 is provided with the first end 216 of the reaction transmitting device 210 close to an area at the enclosure 226 to-be-monitored for leakage 229.

The term "close to" means that the first end 216 is in a proximity to the enclosure 226 that allows for energy transmission of the local thermal energy release 20 to the transmitting device.

In an example of FIG. 2, the system 200 further comprises an envelope 240. The envelope 240 encapsulates the enclosure 226. A gap between the envelope 240 and the enclosure 226 is provided configured as a retainer volume 241. The retainer volume 241 is formed to capture leaking substance 24 from the enclosure 226. At least the first end 216 of the at least one detection arrangement 100 is arranged within the retainer volume 241, the first end 216 being configured to be exposed to the leaking substance 24.

In an option and preferably, the retainer volume 241 comprises an oxygen-poor atmosphere 244, as shown in FIG. 2.

In an option and preferably, the second end 218 of the at least one detection arrangement 100 and the assigned sensing unit 138 are arranged outside 230 the envelope 240.

In an example, an envelope 240 is provided. The envelope 240 can be configured as a bag, or chamber that retains leaking hydrogen in a retainer volume 241.

The term "retainer volume" can also be referred to as trap, collector, accumulator, interceptor, sampler, gatherer, receiver, captivating unit, receiver.

In an example, the retainer volume 241 is filled with an inert gas like nitrogen, helium, argon or sulphur hexafluoride as an oxygen-poor atmosphere 244, as shown in FIG. 2.

In an example, the envelope 240 is a fuel storage space or an inner space of a vehicle.

In an example, the envelope 240 comprises a valve system, not shown in FIG. 2, to ventilate or refill the retainer volume 241. The valve system is configured to ventilate and refill the retainer volume 241 with and/or under an oxygen-poor atmosphere 244, e.g., with an inter gas, nitrogen, argon, helium or atmosphere of an airplane at higher altitudes.

The term "outside 230" refers to the opposite of the inside. Outside 230 describes the surface of the envelope 240 that is not in contact with the retainer volume 241 in FIG. 2.

In an example of FIG. 2, the system 200 further comprises at least one supply line 250 with a shutoff valve 252 and a processor 254. The at least one supply line 250 is connected to the enclosure 226 and configured to supply the enclosure 226 with hydrogen when the shutoff valve 252 is open. The flow of hydrogen is indicated by arrow 253. The shutoff valve 252 is configured to stop hydrogen supply to the enclosure 226 when the shutoff valve 252 is closed. The processor 254 is connected to the at least one sensing unit 138 and to the shutoff valve 252. The at least one detection arrangement 100 is configured to monitor the enclosure 226 and to generate a detection signal 242. Upon receiving a detection signal 242 from the at least one sensing unit 138, the processor 254 is configured to close the shutoff valve 252 in order to stop supply of hydrogen by the supply lines to and/or from the enclosure 226.

It has to be noted, that the shutoff valve 252 in FIG. 2 is actually directly attached to the enclosure 226, without any additional supply line 250 between the shutoff valve 252 and the enclosure 226. The position of the shutoff valve 252 in FIG. 2 has been chosen due to reasons of clarity and visibility. The position of the shutoff valve 252 is chosen such that no residual hydrogen flows in the supply line 250 between the shutoff valve 252 and the enclosure 226 to nurture a leak at enclosure 226.

In an example, the shutoff valve 252 is a cryogenic valve.

In an example, the at least one reaction transmitting device 210 is directly connected to the shutoff valve 252 and the emission reaction 132 closes the shutoff valve 252 in FIG. 2.

In an example, the immediate response of the at least one detector leads to an immediate closure of the shutoff valve 252.

As an effect, hydrogen supply to the enclosure 226 is interrupted immediately.

As an advantage, an improved way of extinguishing a burning substance, e.g., hydrogen micro flames, is provided.

As an advantage, a fire propagation even of a small (micro) hydrogen flame can be avoided by a subsequent quick hydrogen shutoff function.

In an example of FIG. 2, the enclosure 226 is configured as at least one of the group of: a fuel cell configured to provide electrical and/or mechanical energy from hydrogen, a supply system configured to supply hydrogen, a storing unit configured to supply hydrogen via the supply system to a fuel cell and/or a functional unit and a functional unit configured to be contactable by hydrogen.

The term "functional unit" can be understood as gas compressor or heat exchanger or any other entity in contact with hydrogen.

The term "fuel cell" can also be understood as fluid consuming load, a unit that can convert chemical into electrical energy. A continuous supply of fuel is provided to provide for electrical power.

In an example, different emission generating compounds are distributed at different individual regions of the components of the system 200 providing a unique and single chemical identity of the individual regions of the components and the component itself, like a pattern of a fingerprint. Depending on the emission pattern, the individual regions of the components having leaked hydrogen or the component with leaked hydrogen can be detected more accurate and in shorter time and shutoff valves of the different components can be operated more efficiently to stop a fire or the leaking hydrogen.

Figure 3:
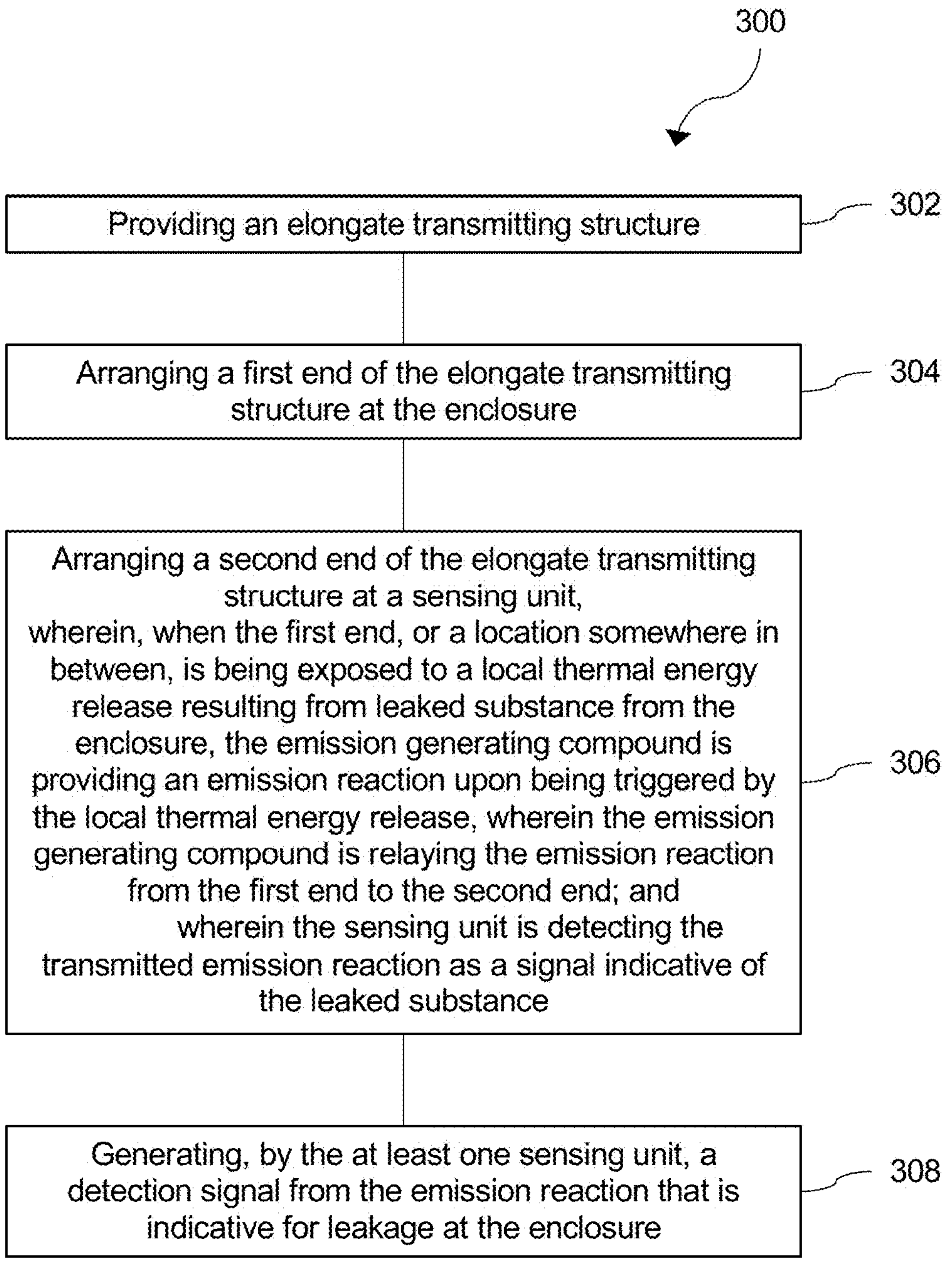
FIG. 3 shows basic steps of an example of a method for leakage communication at an enclosure.

FIG. 3 shows basic steps of an example of a method for leakage communication at an enclosure 226. The method 300 comprises:

In a first step 302, an elongate transmitting structure 14 is provided that is also shown in FIG. 1 and in FIG. 2, In a second step 304, a first end 216 of the elongate transmitting structure 14 is arranged at the enclosure 226, shown in FIG. 2, In a third step 306, a second end 218 of the elongate transmitting structure 14 is arranged at a sensing unit 138. When the first end, or a location somewhere in between, is being exposed to a local thermal energy release 20 resulting from leaked substance 24 from the enclosure 226, the emission generating compound 12 is providing an emission reaction 132 upon being triggered by the local thermal energy release 20. The emission generating compound 12 is relaying the emission reaction 132 from the first end 216 to the second end 218. The sensing unit 138 is detecting the transmitted emission reaction 140 as a signal 42 indicative of the leaked substance 24, and In a fourth step 308, by the at least one sensing unit 138, a detection signal 242 from the emission reaction 132 that is indicative for leakage at the enclosure 226 is generated.

In an example of the method, it is provided to stop the operation of the enclosure 226 with the substance, based on the detection signal.

In an example, as another method step, closing shutoff valves and therefore the hydrogen supply is provided.

In an example, optionally, the elongate transmitting structure 14 is provided in the elongate conduit structure 44.

It has to be noted that embodiments of the disclosure herein are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or example and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A reaction transmitting device, comprising:

an emission generating compound provided as an elongate transmitting structure that has a first end and a second end;

wherein the emission generating compound is arranged reaching from the first end to the second end;

wherein the emission generating compound is configured to be exposed to a local thermal energy release at a trigger location along the elongate transmitting structure, the trigger location being at the first end or between the first end and the second end, the local thermal energy release resulting from a substance leaked or leaking from an enclosure configured to encapsulate the substance from surroundings;

wherein the emission generating compound is configured to provide an emission reaction upon being triggered by the local thermal energy release, the emission reaction comprising a chemical reaction of the emission generating compound;

wherein the emission generating compound is configured to relay the emission reaction from the trigger location along the elongate transmitting structure to the second end by propagating the chemical reaction of the emission generating compound along the elongate transmitting structure; and wherein the second end is configured to be exposed to a sensor configured to detect a transmitted emission reaction as a signal indicative of the substance leaked or leaking from the enclosure.

2. The device according to claim 1, comprising an elongate conduit structure that has a first conduit end and a second conduit end and provides an inner volume between the first conduit end and the second conduit end;

wherein the emission generating compound is arranged within the inner volume, reaching from the first conduit end to the second conduit end;

wherein the first conduit end is configured to be exposed to the local thermal energy release at the trigger location;

wherein the elongate conduit structure is configured to provide for the emission reaction of the emission generating compound upon being triggered by the local thermal energy release;

wherein the elongate conduit structure is configured to relay the emission reaction from the trigger location, along the elongate transmitting structure, and to the second conduit end; and wherein the second conduit end is configured to be exposed to the sensor.

3. The device according to claim 1, wherein:

providing the elongate transmitting structure comprises providing the elongate transmitting structure in an elongate conduit structure; and the elongate conduit structure is configured to sealingly insulate the emission reaction from the surroundings.

4. The device according to claim 1, wherein:

the substance leaked or leaking from the enclosure is leaked hydrogen; and the local thermal energy release results from burning the leaked hydrogen.

5. The device according to claim 1, comprising an ignition substance at least at the first end of the elongate transmitting structure;

wherein the substance leaked or leaking from the enclosure is leaked hydrogen; and wherein the ignition substance, upon contact with the leaked hydrogen, provides the local thermal energy release.

6. The device according to claim 1, wherein the emission generating compound further comprises a reaction starter configured to generate the local thermal energy release upon contact of the emission generating compound with hydrogen and oxygen and/or hydrogen.

7. The device according to claim 1, wherein the elongate conduit structure is further configured to accelerate and/or focus propagation of the emission reaction in a direction from the first end to the second end.

8. The device according to claim 1, wherein the emission generating compound is a pyrotechnic material that is chemically reactive under oxygen-poor atmosphere.

9. A detection arrangement comprising:

at least one sensor; and at least one reaction transmitting device according to claim 1;

wherein the at least one sensor is arranged at the second end of the at least one reaction transmitting device; and wherein the at least one sensor is configured to generate a detection signal upon receiving an emission of the emission reaction from the at least one reaction transmitting device.

10. The arrangement according to claim 9, wherein:

the emission of the emission reaction from the at least one reaction transmitting device is produced from an exothermic oxidation reaction; and the emission comprises matter and/or energy.

11. A supply system responsive to leakage of a substance, the supply system comprising:

an enclosure for storing the substance; and at least one detection arrangement according to claim 9;

wherein the at least one detection arrangement is provided with the first end of the at least one reaction transmitting device close to an area at the enclosure to be monitored for leakage of the substance.

12. The system according to claim 11, comprising an envelope that encapsulates the enclosure;

wherein the envelope and the enclosure are spaced apart from each other by a gap that is configured as a retainer volume formed to capture the substance when leaking from the enclosure;

wherein at least the first end of the at least one detection arrangement is within the retainer volume, the first end being configured to be exposed to the substance when leaking from the enclosure;

wherein the retainer volume comprises an oxygen-poor atmosphere; and wherein the second end of the at least one detection arrangement and an assigned sensor of the at least one sensor are outside the envelope.

13. The system according to claim 11, comprising:

at least one supply line with a shutoff valve; and a processor;

wherein the at least one supply line is connected to the enclosure and configured to supply the enclosure with hydrogen when the shutoff valve is open;

wherein the shutoff valve is configured to stop hydrogen supply to the enclosure when the shutoff valve is closed;

wherein the processor is connected to the at least one sensor and to the shutoff valve;

wherein the at least one detection arrangement is configured to monitor the enclosure and to generate a detection signal; and wherein, upon receiving a detection signal from the at least one sensor, the processor is configured to close the shutoff valve to stop supply of hydrogen by the supply lines to and/or from the enclosure.

14. The system according to claim 11, wherein the enclosure is configured as at least one of:

a fuel cell configured to provide electrical and/or mechanical energy from hydrogen;

a supply system configured to supply hydrogen;

a storing unit configured to supply hydrogen via the supply system to a fuel cell and/or a functional unit; and a functional unit configured to be contactable by hydrogen.

15. A method for communicating information about leakage of a substance from an enclosure, the method comprising:

providing an elongate transmitting structure comprising an emission generating compound;

arranging a first end of the elongate transmitting structure at the enclosure;

arranging a second end of the elongate transmitting structure at a sensor;

providing, by the emission generating compound, when the first end, or a trigger location at or between the first end and the second end, is being exposed to a local thermal energy release resulting from the substance leaked or leaking from the enclosure, an emission reaction when the emission generating compound is triggered by the local thermal energy release, the emission reaction comprising a chemical reaction of the emission generating compound;

relaying, by the emission generating compound, the emission reaction from the trigger location along the elongate transmitting structure to the second end by propagating the chemical reaction of the emission generating compound along the elongate transmitting structure, the trigger location being at the first end or between the first end and the second end;

detecting, by the sensor, the transmitted emission reaction as a signal indicative of the substance leaked or leaking from the enclosure; and generating, by the sensor, a detection signal from the emission reaction that is indicative of leakage of the substance at and/or from the enclosure.

16. The method according to claim 15, wherein providing the elongate transmitting structure comprises providing the emission generating compound in an elongate conduit structure that has a first conduit end and a second conduit end and provides an inner volume between the first conduit end and the second conduit end;

wherein the emission generating compound is arranged within the inner volume, reaching from the first conduit end to the second conduit end;

wherein the first conduit end is exposed to the local thermal energy release at the trigger location;

wherein the elongate conduit structure provides for the emission reaction of the emission generating compound upon the emission generating compound being triggered by the local thermal energy release;

wherein the elongate conduit structure relays the emission reaction from the trigger location along the elongate transmitting structure to the second conduit end; and wherein the second conduit end is exposed to the sensor.

17. The method according to claim 15, wherein:

providing the elongate transmitting structure comprises providing the elongate transmitting structure in an elongate conduit structure; and the elongate conduit structure sealingly insulates the emission reaction from the surroundings.

18. The method according to claim 15, wherein:

the substance leaked or leaking from the enclosure is leaked hydrogen; and the local thermal energy release results from burning the leaked hydrogen.

19. The method according to claim 15, comprising providing an ignition substance at least at the first end of the elongate transmitting structure;

wherein the substance leaked or leaking from the enclosure is leaked hydrogen; and wherein the ignition substance, upon contact with the leaked hydrogen, provides the local thermal energy release.

20. A supply system responsive to leakage of a substance, the supply system comprising:

an enclosure configured to store the substance;

at least one sensor; and at least one reaction transmitting device comprising an emission generating compound provided as an elongate transmitting structure that has a first end and a second end;

wherein the emission generating compound is arranged reaching from the first end to the second end;

wherein the emission generating compound is configured to be exposed to a local thermal energy release at a trigger location along the elongate transmitting structure, the trigger location being at the first end or between the first end and the second end, the local thermal energy release resulting from the substance leaked or leaking from the enclosure;

wherein the emission generating compound is configured to provide an emission reaction upon being triggered by the local thermal energy release;

wherein the emission generating compound is configured to relay the emission reaction from the trigger location along the elongate transmitting structure to the second end;

wherein the at least one sensor is arranged at the second end of the at least one reaction transmitting device;

wherein the at least one sensor is configured to generate a detection signal upon receiving an emission of the emission reaction from the at least one reaction transmitting device;

wherein the first end of the at least one reaction transmitting device is provided close to an area at the enclosure to be monitored for leakage of the substance; and wherein the supply system further comprises at least one of:

(A) an envelope that encapsulates the enclosure;

wherein the envelope and the enclosure are spaced apart from each other by a gap that is configured as a retainer volume formed to capture the substance when leaking from the enclosure;

wherein at least the first end of the at least one reaction transmitting device is within the retainer volume, the first end being configured to be exposed to the substance when leaking from the enclosure;

wherein the retainer volume comprises an oxygen-poor atmosphere; and wherein the second end of the at least one reaction transmitting device and an assigned sensor of the at least one sensor are outside the envelope; and (B) at least one supply line with a shutoff valve and a processor;

wherein the at least one supply line is connected to the enclosure and configured to supply the enclosure with hydrogen when the shutoff valve is open;

wherein the shutoff valve is configured to stop hydrogen supply to the enclosure when the shutoff valve is closed;

wherein the processor is connected to the at least one sensor and to the shutoff valve;

wherein the at least one reaction transmitting device is configured to monitor the enclosure and the at least one sensor is configured to generate the detection signal; and wherein, upon receiving the detection signal from the at least one sensor, the processor is configured to close the shutoff valve to stop supply of hydrogen by the at least one supply line to and/or from the enclosure.

* * * * *